United States Patent
Kindarji et al.

(10) Patent No.: US 9,692,592 B2
(45) Date of Patent: Jun. 27, 2017

(54) USING STATE REORDERING TO PROTECT AGAINST WHITE BOX ATTACKS

(71) Applicant: Apple Inc., Cupertino, CA (US)

(72) Inventors: Bruno Kindarji, Paris (FR); Benoit Chevallier-Mames, Paris (FR); Mathieu Ciet, Paris (FR); Augustin J. Farrugia, Los Altos Hills, CA (US); Thomas Icart, Paris (FR)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/866,997

(22) Filed: Sep. 27, 2015

(65) Prior Publication Data

US 2016/0359618 A1    Dec. 8, 2016

Related U.S. Application Data

(60) Provisional application No. 62/171,826, filed on Jun. 5, 2015.

(51) Int. Cl.
| | |
|---|---|
| H04L 29/06 | (2006.01) |
| H04L 9/06 | (2006.01) |
| H04L 9/14 | (2006.01) |

(52) U.S. Cl.
CPC .............. H04L 9/0618 (2013.01); H04L 9/14 (2013.01); H04L 63/1466 (2013.01); H04L 2209/24 (2013.01); H04L 2209/34 (2013.01)

(58) Field of Classification Search
CPC ...... H04L 9/0618; H04L 9/14; H04L 63/1466
See application file for complete search history.

(56) References Cited

U.S. PATENT DOCUMENTS

| | | | | |
|---|---|---|---|---|
| 4,322,577 A | * | 3/1982 | Brandstrom | H04L 9/0618 380/29 |
| 6,185,179 B1 | * | 2/2001 | Mohrin | G11B 3/00 369/127 |
| 7,508,937 B2 | * | 3/2009 | Stein | H04L 9/0631 380/37 |
| 9,143,317 B2 | * | 9/2015 | Chevallier-Mames | H04L 9/002 |
| 2003/0099352 A1 | * | 5/2003 | Lu | H04L 9/0631 380/37 |
| 2003/0133568 A1 | * | 7/2003 | Stein | H04L 9/0631 380/37 |
| 2010/0104095 A1 | * | 4/2010 | Halevi | H04L 9/002 380/29 |
| 2011/0305334 A1 | * | 12/2011 | Nakamura | H04L 63/0428 380/255 |
| 2014/0348323 A1 | * | 11/2014 | Chevallier-Mames | H04L 9/002 380/28 |

OTHER PUBLICATIONS

Dawood et al., "The Euphrates Ciphers", IJCSI International Journal of Computer Science Issues, vol. 12, Issue 2, Mar. 2015.*

* cited by examiner

*Primary Examiner* — Chau Le
(74) *Attorney, Agent, or Firm* — Blakely, Sokoloff, Taylor & Zafman LLP

(57) ABSTRACT

Some embodiments provide a method for performing an iterative block cipher. Line rotations and column rotations are combined to have a diversity of representations of the AES state. These protections can be performed either in static mode where the rotations are directly included in the code and the tables or in dynamic mode where the rotations are chosen randomly at execution time, depending on some entropic context variables. The two modes can also be advantageously combined together.

27 Claims, 16 Drawing Sheets

800

| x12 | x0  | x4  | x8  |
| --- | --- | --- | --- |
| x1  | x5  | x9  | x13 |
| x6  | x10 | x14 | x2  |
| x11 | x15 | x3  | x7  |

*Fig. 8*

USING STATE REORDERING TO PROTECT AGAINST WHITE BOX ATTACKS

CLAIM OF BENEFIT TO PRIOR APPLICATIONS

This application claims the benefit of U.S. Provisional Patent Application 62/171,826, filed Jun. 5, 2015. U.S. Provisional Patent Application 62/171,826 is incorporated herein by reference.

BACKGROUND

Cryptographic algorithms are widely used for encryption of messages, authentication, encryption signatures and identification. The well-known DES (Data Encryption Standard) has been in use for a long time, and was updated by Triple-DES, which has been replaced in many applications by AES (Advanced Encryption Standard). AES is an approved encryption standard by the U.S. government. AES is a substitution permutation network, that is fast enough to execute in both computer software and hardware implementations, relatively easy to implement, and requires little memory space.

Implementations of AES do not provide much security against an attacker recovering a secret key, if the attacker has privileged access to the system implementing the cipher. However, AES is often used in potentially insecure environments. For instance, AES could be employed in a white box environment. In a white box model, it is presumed that an attacker has total access to the system performing an encryption, including being able to observe directly a state of memory, program execution, and so on. In such a model, an encryption key can be observed in or extracted from memory, ways to conceal operations indicative of a secret key are therefore important. For example, the attacker can learn the secret key of an AES software implementation by observing the execution of the key scheduling algorithm.

Digital rights management (DRM) applications are one instance where it is desired to keep the attacker from finding the secret key even though the attacker has complete control of the execution process. "White-Box Cryptography and an AES Implementation", by Stanley Chow, Philip A. Eisen, Harold Johnson, Paul C. van Oorschot, in Selected Areas in Cryptography: $9^{th}$ Annual International Workshop, SAC 2002, PP. 250-270, gives a construction of the AES algorithm for such white box model. The security of this construction resides in the use of table lookups and masked data. The input and output mask applied to this data is never removed along the process. In this solution, there is a need for knowing the key value at the compilation time, or at least to be able to derive the tables from the original key in a secure environment.

However, this solution does not solve all needs for block cipher's encryption. Indeed, the case where the key is derived through a given process and then unknown at the compilation time is not included. One typical use case is when a program is distributed over several users and each of them has their own key. In this case, it is from a practical point of view impossible to disseminate different code to each user. Another use case is when generating session keys (which are different for each session) through a given process. Of course, in this case the key is unknown at compilation time. Another use case is when it is necessary to store a large number of keys. However, it is not reasonable to consider storing around 700 KB for each key.

BRIEF SUMMARY

Some embodiments provide protection in AES whiteboxes. In particular, line rotations and column rotations are combined to have a diversity of representations of the AES state. These protections are performed either in static mode where the rotations are directly included in the code and the tables or in dynamic mode where the rotations are chosen randomly at execution time, depending on some entropic context variables. The two modes can also be advantageously combined together.

The methods can be made almost costless on some architecture such as Intel CPUs with "streaming single instruction multiple data extensions" (SSE) instructions. The dynamic mode protections are particularly useful in the case of statistical attacks, since they allow breaking the mapping between one byte of the mathematical computations and one address of the executed code, thus providing additional protection.

The preceding Summary is intended to serve as a brief introduction to some embodiments as described herein. It is not meant to be an introduction or overview of all subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIG. 8 illustrates the state after the column rotation3 (CR3) operation is performed in state of FIG. 7.

DETAILED DESCRIPTION

Figure 1:
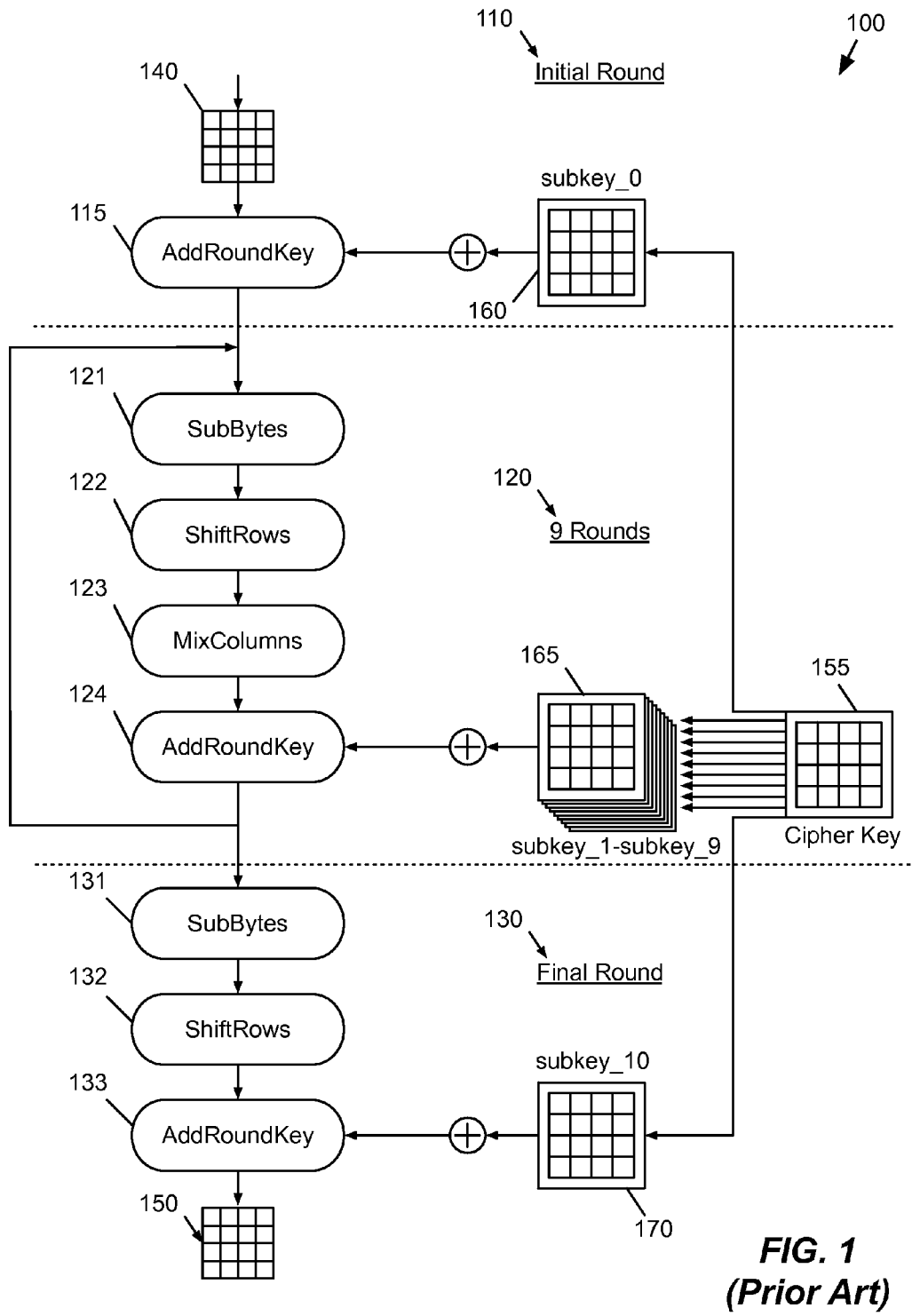
FIG. 1 provides a conceptual illustration of an example cryptographic operation according to the AES standard.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Conventional cryptography techniques were intended to protect confidential information from malicious attackers. The confidential data was protected from everyone except from the recipient. In environments such as DRM or client software running in the cloud, the receiving platform is controlled by potentially hostile end-users. In these environments, white-box cryptography techniques are required to prevent attackers from extracting the cryptographic keys and then redistribute the protected content.

A weakness of white-box representations of cryptographic algorithms is that a stolen state representation can be linked to a regular execution of the same algorithm, and thus help cryptographic attacks on the white-box. Some embodiments use properties of the AES round structure to add dynamic protections to the white-box AES implementations. These protections are applicable to encryption as well as decryption. Although the invention is described using the example of AES, the invention can be extended to other cryptographic algorithms.

Some embodiments make use of different indexes as a protection in AES white-boxes. In particular, line rotations and column rotations, are combined to have a diversity of representations of the AES state. These protections can be performed either in static mode (i.e., the rotations are directly included in the code and the tables) or in dynamic mode (i.e., the rotations are chosen randomly at execution time, depending on some entropic context variables). The two modes can also be advantageously combined together.

These methods are very cost-efficient and can be implemented in static mode and in dynamic mode. The methods can be made almost costless on some architecture such as Intel CPUs with "streaming single instruction multiple data extensions" (SSE) instructions. The dynamic cases are particularly useful in the case of statistical attacks, since they allow breaking the mapping between one Byte of the mathematical computations and one address of the executed code, thus providing additional protection.

Many more details of embodiments of the multi-block cryptographic operations will be discussed below. Section I provides a detailed discussion of AES as an example of a multi-round block cipher operation. Section II then describes using line rotations for state reordering. Finally, Section III describes an electronic system with which some embodiments of the invention are implemented.

I. Description of AES

Before describing the computation of key schedules of some embodiments in further detail, an example of AES is described. Block ciphers are deterministic algorithms that operate on blocks of fixed-length data of input and generate same size blocks of output referred to as ciphertext. While one of ordinary skill in the art will recognize that the principles described in this specification are applicable to various different forms of block cipher, they are described in part by reference to the AES block cipher.

FIG. 1 provides a conceptual illustration of an example cryptographic operation 100 (e.g., an encryption or decryption operation) according to the AES standard. As shown, input data 140 is processed in an initial round 110, nine middle rounds 120, and a final round 130, to produce output state 150. For a decryption operation, the input data 140 is encrypted data (referred to as cipher text) and the output state 150 is decrypted data (which may be plain text, or cipher text in the case that the input data was encrypted multiple times). Similarly, for encryption, the input data 140 may be previously encrypted data or unencrypted data (cipher text or plain text), and the output data 150 is encrypted data (cipher text, which will be twice encrypted in the case that the input is also cipher text). The input data 140 can be any computer readable message (or, more accurately, a block of such a computer readable message). For instance, the input data 140 could be a portion of an encrypted content file, video content, image content, audio content, a computer message, a secure transmission, or any other string of values that can be encoded as bits.

In some embodiments, AES has a fixed block size of 128 bits and a key size of 128, 192 or 256 bits. Due to the fixed block size of 128 bits, AES operates on a 4×4 array of bytes (e.g., 16 bytes). Accordingly, the input data 140 is a 16-byte array of information, which may be a sub-portion of a larger message. For instance, a 3 megabyte audio file can be divided into 16 byte portions and each portion encrypted according to operation 100. During the operations of AES, the input data 140, as manipulated, may be referred to as "AES state". AES state is a 16-byte buffer (or 4 words) upon which the AES operations are performed.

AES uses key expansion, and like most block ciphers, a set of encryption and decryption rounds (iterations). Each round involves similar processes. As shown in FIG. 1, the initial round 110, nine middle rounds 120, and final round 130 each includes similar operations (e.g., SubBytes, ShiftRows, MixColumns, and AddRoundKey). The entire AES encryption algorithm (e.g., operation 100) includes 11 AddRoundKey (ARK) operations, 10 SubBytes (SB) operations, 10 ShiftRows (SR) operations, and 9 MixColumns (MC) operations. Preliminarily to operation 100, the original 16-byte cipher key 155 is expanded to 11 subkeys, during what is called a key scheduling operation. The 11 subkeys include subkey_0 160, subkey_1-subkey_9 165, and subkey_10 170. The eleven subkeys are each used in different rounds of operation 100. Each subkey is 16 bytes long, in some embodiments, to match the size of the AES state.

In the initial round 110, the cryptographic operation 100 receives input data 140 and performs AddRoundKey operation 115. The AddRoundKey operation 115 combines input data 140 with the subkey_0 155. Specifically, this operation 115 performs a logical exclusive disjunction operation (hereinafter "XOR") on subkey_0 160 and input data 140, in order to produce intermediate AES state.

Following the initial round 110, operation 100 performs nine middle rounds 120. Each of the nine middle rounds 120 includes four operations: SubBytes 121, ShiftRows 122, MixColumns 123, and AddRoundKey 124. The SubBytes operation 121 substitutes the bytes of the current AES state according to a substitution table. This substitution table is sometimes referred to as a substitution box or "S-BOX" table. This operation provides non-linearity in the cipher.

The ShiftRows operation 122 cyclically shifts bytes in each row of the AES state by certain offsets. As the AES state is a 4×4 16-byte array, the AES state can be arranged in a 4 row, 4 column arrangement. ShiftRows 122 will shift different rows of the 4×4 AES state by different amounts. For instance, in some embodiments, the first row is left unchanged, each byte of the second row is shifted one to the left, and the third and fourth rows are shifted by offsets of two and three respectively.

The MixColumns operation 123 combines bytes of the AES state from each column using an invertible linear transformation. The MixColumns operation 123 takes four bytes as input and outputs four bytes, where each input byte affects all four output bytes. The MixColumns operation may be implemented via one or more table lookup operations. Together with the ShiftRows operation, the MixColumns operation provides diffusion in the cipher.

The AddRoundKey operation 124 combines a round key from one of subkey_1-subkey_9 165 with the AES state, depending on the round, in the same manner as the AddRoundKey operation 115. For each round, a subkey is derived from cipher key 155. Each subkey is the same size as the AES state (e.g., a 4×4 16-byte array). The subkey is combined with the AES state using an XOR operation.

The cryptographic operation 100 performs nine such rounds on the AES state. Once the nine middle rounds 120 are completed, the operation 100 performs a final round 130, which includes a SubBytes operation 131, a ShiftRows operation 132, and an AddRoundKey operation 133. These final operations are the same as those described above in connection with the earlier rounds. The eleventh subkey_10 170 is combined with the AES state to produce output state 150.

The previous description of operation 100 corresponds to the order of operations required to encrypt content. Decryption operations under AES are substantially similar, but the order of operations is reversed and inverses of the operations are used. The inverse of AddRoundKey is AddRoundKey itself. The inverse of SubBytes is Inverse SubBytes, which is another table look up operation. The inverse of MixColumns is Inverse MixColumns, which is also another lookup operation. The inverse of ShiftRows is Inverse ShiftRows, which is another move from one byte location to another. Different versions of AES (e.g., the 256-bit variant) can include different numbers of rounds and different key sizes. For further detail on AES, see the specification for the Advanced Encryption Standard (AES), National Institute of Standards and Technology (NIST), which can be found on the Internet.

II. Using Line Rotations for State Reordering

A. Variations with State Representation

Figure 2:
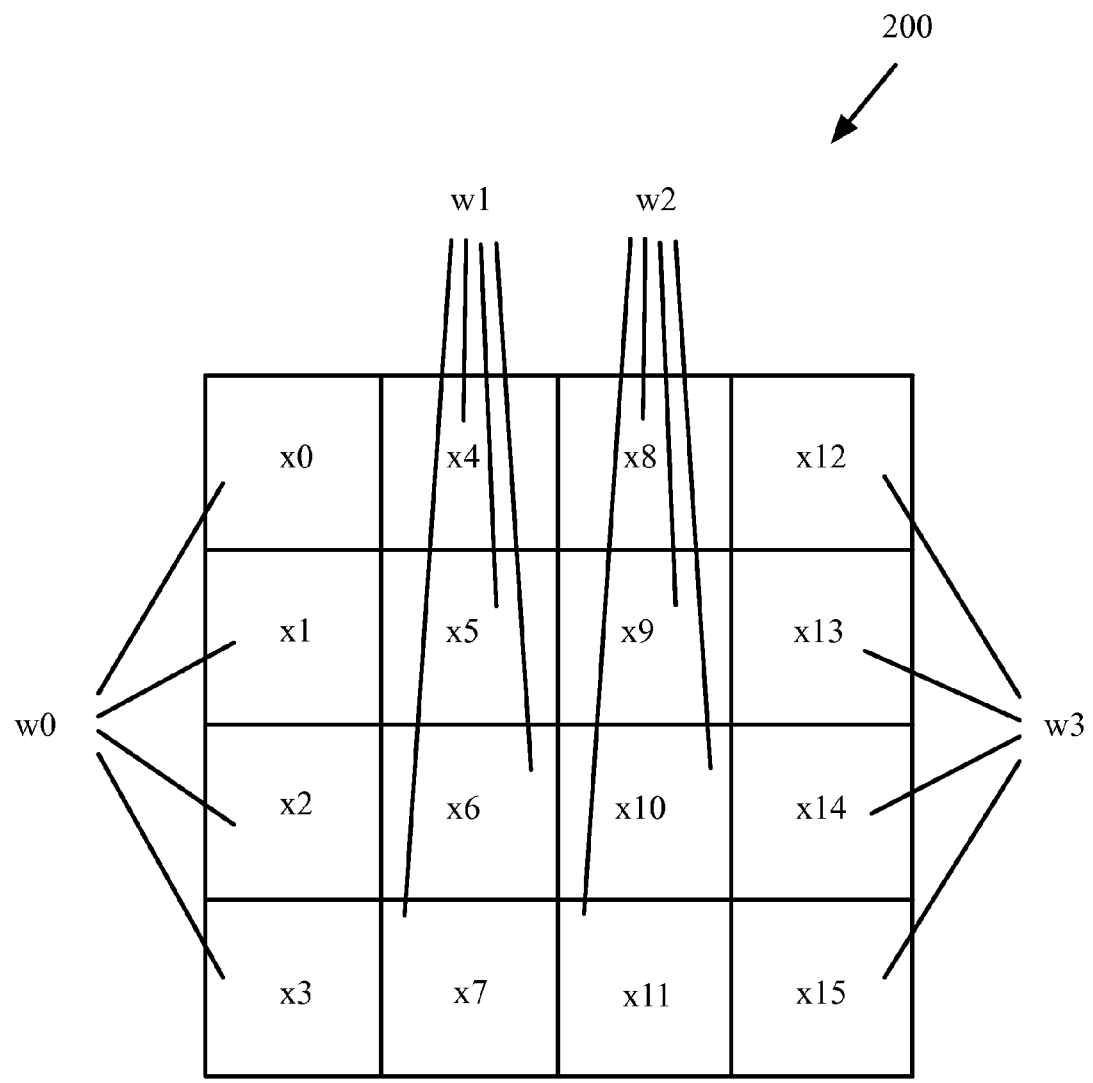
FIG. 2 illustrates a representation of an AES state by four words where each word represents a column.
Figure 3:
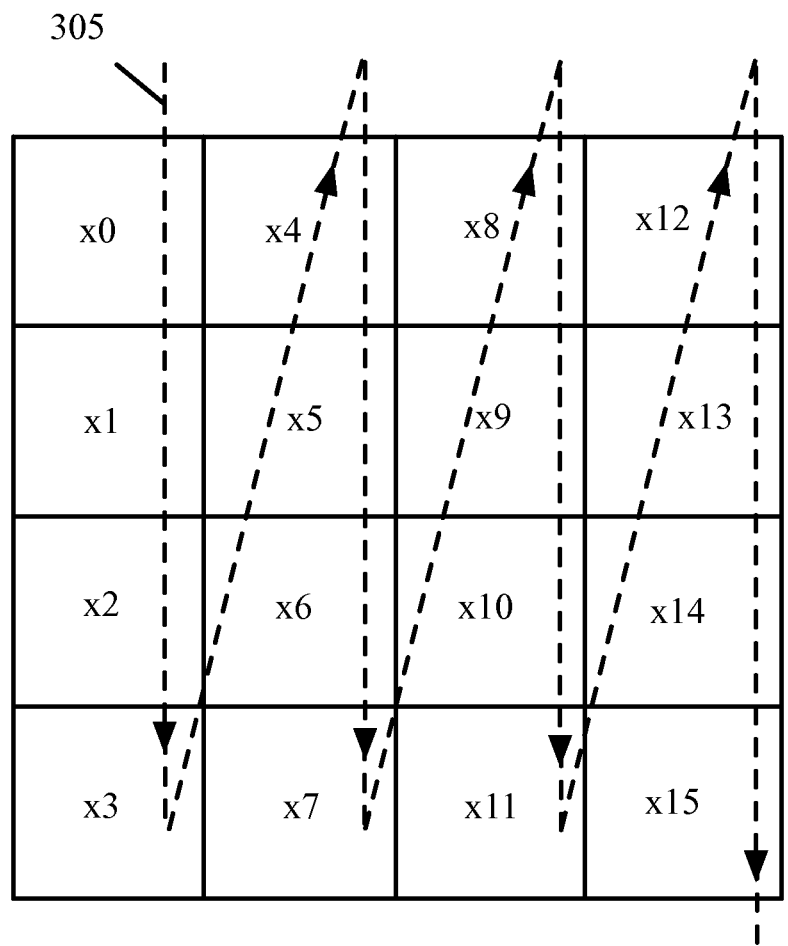
FIG. 3 illustrates the order of bytes x0-x15 in the state of FIG. 2.

The AES state is typically represented by four words that each represents a column, or by 16 Bytes in the order of the columns, that represent the state. FIG. 2 illustrates a representation of an AES state by four words where each word represents a column. As shown, the state 200 includes 16 bytes x0-x15 or 4 words w0-w3. Each column in the state 200 includes one of the words w0-3. FIG. 3 illustrates the order 305 of bytes x0-x15 in the state 200 of FIG. 2.

However there is no need to keep this representation in a white-box computation of the AES. Consider a permutation of $\{0, \ldots, 15\}$, denoted a, and a 16-Byte state S (such as state 200 in FIG. 2). The following describes the effect of the AES operations on a(S) compared to the operations on S. Composition of permutations is denoted "o" (i.e., P o Q denotes the permutation defined by P o Q (x)=P(Q(x))).

The Add Round Key is a bit-wise operation, which means that $ARK(\sigma(S), \sigma(K))=\sigma(ARK(S, K))$. In other words ARK and σ commutes. The Sub-Byte is a Byte-wise operation, so here again, $SB(\sigma(S))=\sigma(SB(S))$. In other words, SB and σ commutes.

The Shift-Row is itself a permutation of the state, therefore $SR(\sigma(S))=\tau(SR(S))$, where $\tau=SR \circ \sigma \circ SR^{}(-1)$. In the preceding equation  is an operation such that $f^{}n = f(f(\ldots(f(\;)))$, where f is applied n times and that $f^{}-1$ is the inverse of f. Then, SR of a permuted state with σ is the permutation of the state with τ after the application of SR. The Mix-Column is a more complex operation, because it is used to mix the different Bytes of the state after a round. So, there are only a few permutations a that combine interestingly with Mix-Column as described below.

B. Column Rotations

MixColumn is an operation that operates on columns only. In other words, if the state S is written, column-wise, i.e. S=(c1, c2, c3, c4), then MC(S)=(mix(c1), mix(c2), mix(c3), mix(c4)) where mix(.) is a function from 32 bits to 32 bits. Consider the so-called column rotation (CR for short), defined as CR(c1, c2, c3, c4)=(c2, c3, c4, c1). As one can see, a column rotation is a special kind of permutation σ, with some special properties.

As explained above, σ and therefore CR commutes with ARK and with SB. From the structure of the MC and SR operations, it is evident that CR also commutes with these operations. So, CR is an operation that commutes completely with an AES round, and with the AES itself.

From this, all the iterations of CR commute with the AES operations, i.e. CR2 and CR3 also commute with the ARK, SB, SR and MC. As a side note, CR2(c1, c2, c3, c4)=(c3, c4, c1, c2) and CR3(c1, c2, c3, c4)=(c4, c1, c2, c3). Column rotations are explained in more detail in U.S. Patent Publication 2014/0348323, which is in incorporated herein by reference.

C. Line Rotations

Consider the line rotation (LR), defined as:

$$LR(c1,c2,c3,c4)=(rot8(c1),rot8(c2),rot8(c3),rot8(c4))$$

where rot8(.) is the rotation by 8 bits to the top. It should be understood that the disclosed methods are also applicable when the rotation is performed by 8 bits to the bottom (rotation by 8 bits (or 1 byte) to bottom is equal to rotation by 3 bytes to top). Similarly, the disclosed methods are also applicable when rotation to the top (or to the bottom) is performed by 16 bits (2 bytes) or 24 bits (3 bytes). As described by reference to FIGS. 2 and 4 below, applying LR to a column with bytes x0, x1, x2, x3 arranged from top to bottom results in a column with bytes x1, x2, x3, x0 arranged from top to bottom.

LR is a special kind of permutation a, with some special properties. If the state S is seen as a matrix, with T the transposition function, LR can be defined as: LR=T o CR o T. The transposition T is defined as the reflection of the matrix over its main diagonal (which runs from top-left to bottom right).

The Mix-Column has the following property, since it is defined as a linear operation:

MC(x)=2.Id(x)xor LR(x)xor LR2(x)xor 3.LR3(x)

The constants 2 and 3 are multiplicative, and can be interpreted as endomorphisms of the vector space GF(256)16, where "" denotes the power of. GF(256)16 is the dimension 16 vector where each dimension is GF(256). Specifically, each element of GF(256)16 is a vector of 16 coordinates, each coordinate is GF(256). The constants 2 and 3 are the multiplication by 2 and 3 of all the coordinates in GF(256). There is an equivalent formula with different constants for inverse MC (IMC) operation.

Since MC is, in fact, a polynomial in the permutation LR, LR commutes with MC. The only AES operation that does not commute with LR is the ShiftRow. The encryption round of the AES can be written:

$$\begin{aligned}
AES\_ENC(LR(S), LR(K)) &= MC \cdot SR \cdot SB \cdot ARK\,(LR(S), LR(K)) \\
&= MC \cdot SR \cdot LR \cdot SB \cdot ARK\,(S, K) \\
&= MC \cdot LR \cdot LR^{**}(-1) \cdot SR \cdot LR \cdot SB \cdot \\
&\quad ARK\,(S, K) \\
&= LR \cdot MC \cdot LR^{**}(-1) \cdot SR \cdot LR \cdot SB \cdot \\
&\quad ARK\,(S, K) \\
&= LR \cdot MC \cdot F \cdot SB \cdot ARK\,(S, K)
\end{aligned}$$

Figure 4:
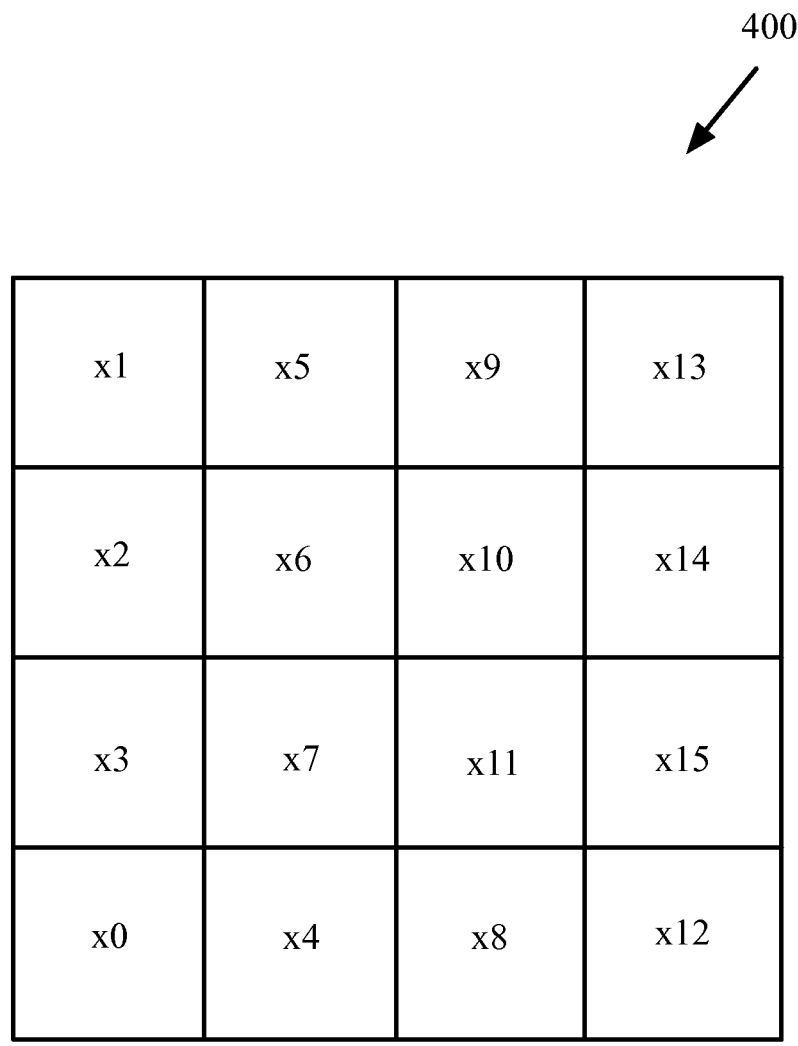
FIG. 4 illustrates the state after the line rotation (LR) operation is performed on state of FIG. 2.
Figure 5:
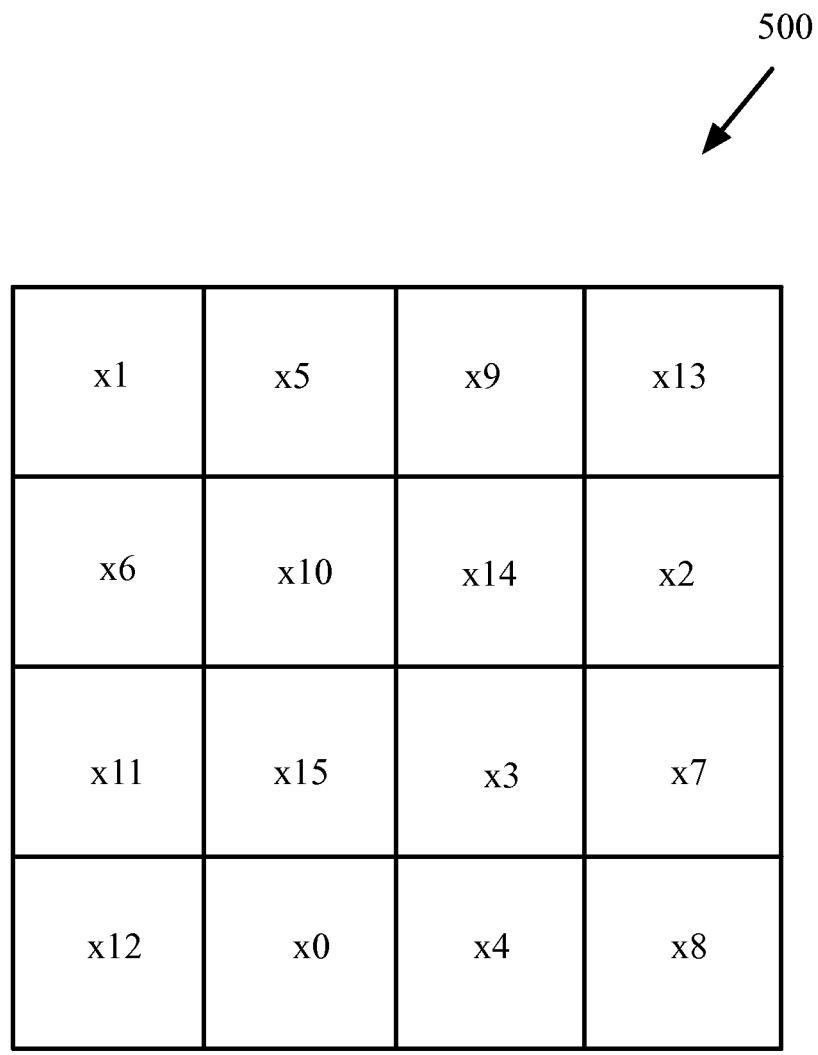
FIG. 5 illustrates the state after the SR operation is performed in state of FIG. 4.
Figure 6:
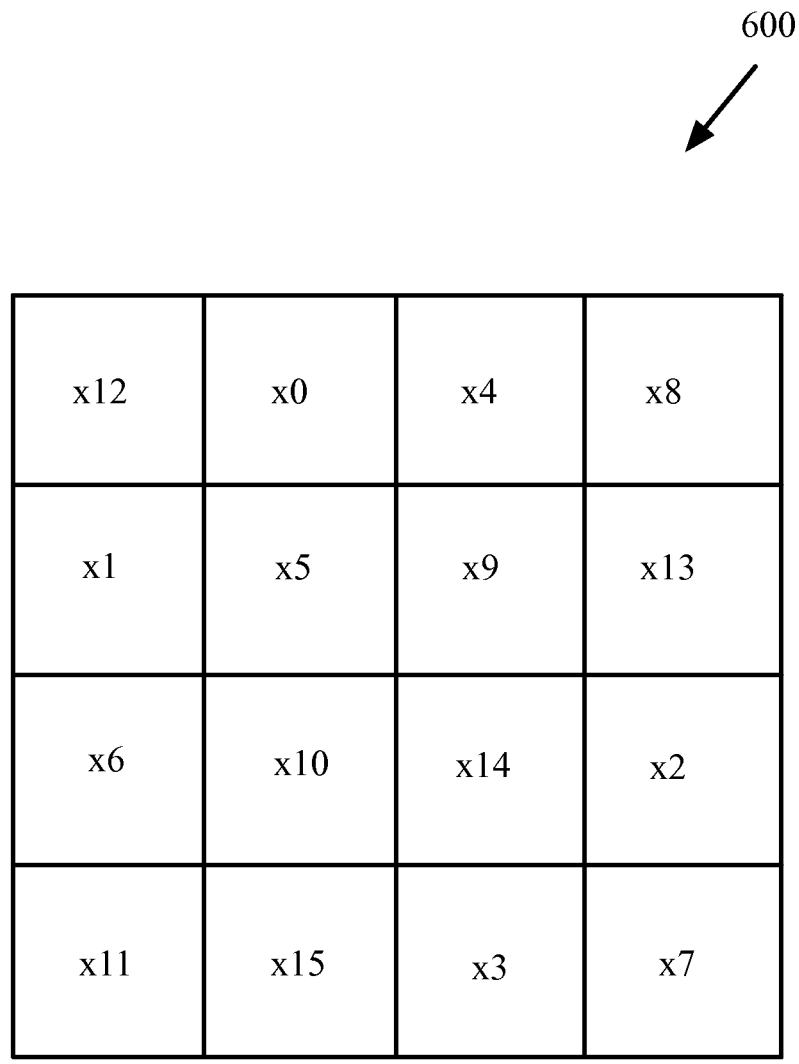
FIG. 6 illustrates the state after the LR**(−1) operation is performed in state of FIG. 5.

The function F is defined as F=LR**(-1) o SR o LR. FIGS. 4-6 illustrate the effect of F over a state s=(x0, . . . x15) such as the state 200 described above by reference to FIG. 2. While AES-128 is used as an example, the embodiments described can also employ line rotation when using AES-192, AES-256, or some other iterated block ciphers.

FIG. 4 illustrates the state 400 after the line rotation (LR) operation is performed on state 200 of FIG. 2. As shown, LR(c1, c2, c3, c4)=(rot8(c1), rot8(c2), rot8(c3), rot8(c4)), which cause the rotation of each word by 8 bits to top. FIG. 5 illustrates the state 500 after the SR operation is performed in state 400 of FIG. 4. FIG. 6 illustrates the state 600 after the LR**(-1) operation is performed in state 500 of FIG. 5.

Figure 7:
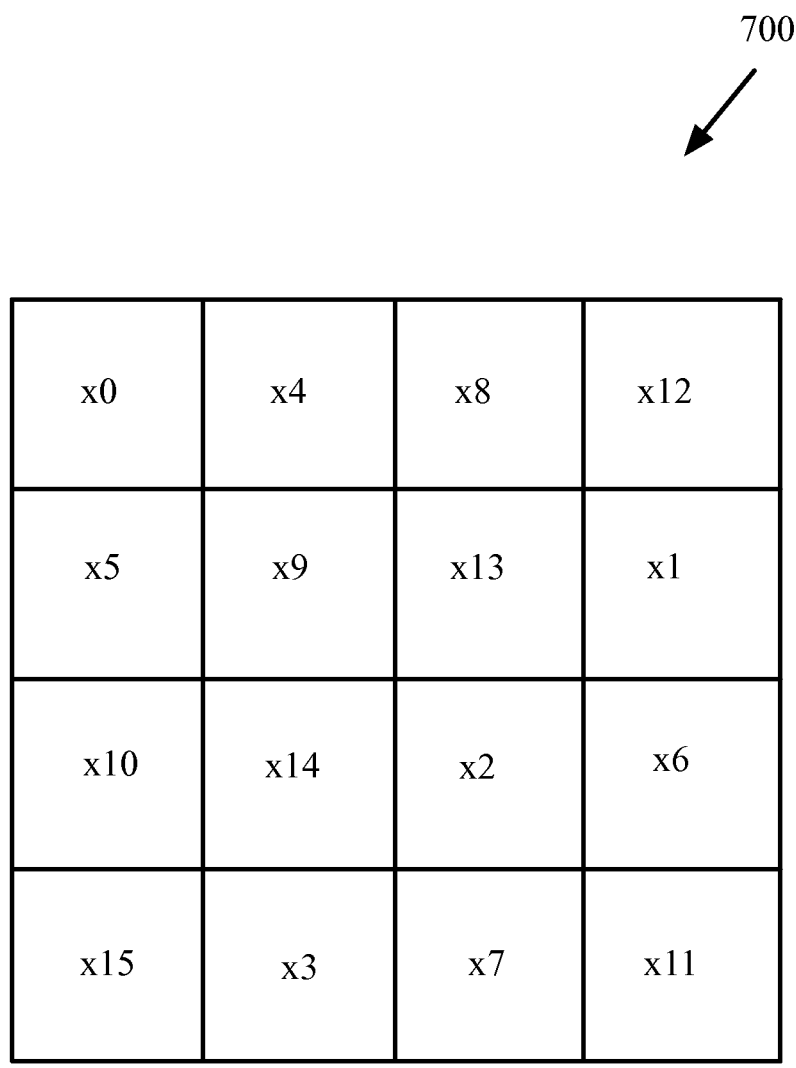
FIG. 7 illustrates the state after the ShiftRows (SR) operation is performed on state of FIG. 6.

As shown in FIGS. 7 and 8, F(S) is the same as CR3 o SR(S). FIG. 7 illustrates the state 700 after the ShiftRows (SR) operation is performed on state 200 of FIG. 6. FIG. 8 illustrates the state 800 after the column rotation3 (CR**3) operation is performed in state 700 of FIG. 7. As shown, the resulting state 800 in FIG. 8 is the same as state 600 in FIG. 6.

As a result, AES_ENC(LR(S), LR(K))=LR o CR o AES_ENC(S, K), where AES_ENC is one round of AES encryption, S is the AES state, and K is the current round subkey. This means that the Line Rotation operation can be introduced before an AES round, but injects a Column Rotation operation in addition to the Line Rotation on the output.

From a protection point of view, this further randomizes the operations. Also, LR and CR are commutable permutations, which is a very useful property.

Figure 9:
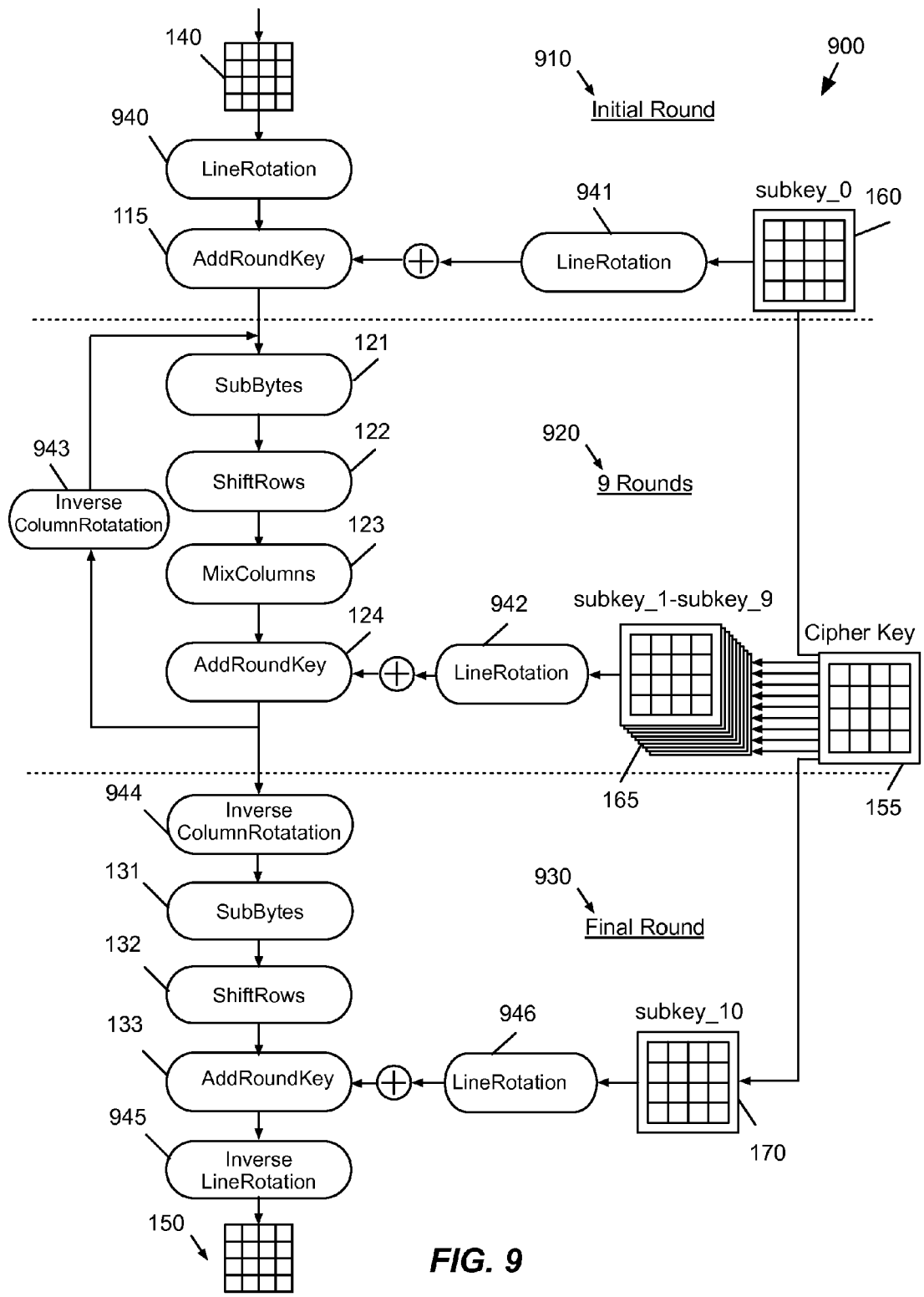
FIG. 9 conceptually illustrates an example cryptographic operation (e.g., an encryption or decryption operation) that uses line rotation to reorder the state for several rounds of cryptographic process in some embodiments of the invention.

FIG. 9 conceptually illustrates an example cryptographic operation 900 (e.g., an encryption or decryption operation) that uses line rotation to reorder the state for several rounds of cryptographic process in some embodiments of the invention. Similar to FIG. 1, input data 140 is processed in an initial round 910, nine middle rounds 920, and a final round 930, to produce output state 150. For a decryption operation, the input data 140 is encrypted data (referred to as cipher text) and the output state 150 is decrypted data (which may be plain text, or cipher text in the case that the input data was encrypted multiple times). Similarly, for encryption, the input data 140 may be previously encrypted data or unencrypted data (cipher text or plain text), and the output data 150 is encrypted data (cipher text, which will be twice encrypted in the case that the input is also cipher text). The input data 140 can be any computer readable message (or, more accurately, a block of such a computer readable message). For instance, the input data 140 could be a portion of an encrypted content file, video content, image content, audio content, a computer message, a secure transmission, or any other string of values that can be encoded as bits.

Operations that are similar to operations of FIG. 1 are not repeated for simplicity. As shown in FIG. 9, in the initial round 910, a LineRotate operation 940 is applied to state 140. A LineRotate operation 941 is also applied to subkey_0 160. Both state and subkey inputs to round 1 are lined rotated. As described above, the state output after round 1 includes one extra Line Rotation and one extra Column Rotation. The Column Rotation is removed by the Inverse ColumnRotation operation 943. The extra Line Rotation in the state at the end of round 1 is, however, not removed since a Line Rotation has to be applied to the state at the beginning of the second round.

A LineRotation operation 942 is applied to each subkey_1 to subkey_9 for rounds 1 to 9 (middle rounds 920). At the beginning of the final round 930 (or the end of round 9), an Inverse ColumnRotation 944 is applied to the state. An Inverse LineRotation 945 is applied to AddRoundKey 133. A LineRotate operation 946 is also applied to subkey_10 170. The final state 150 in FIG. 9 is the same as the final state 150 in FIG. 1.

Figure 10:
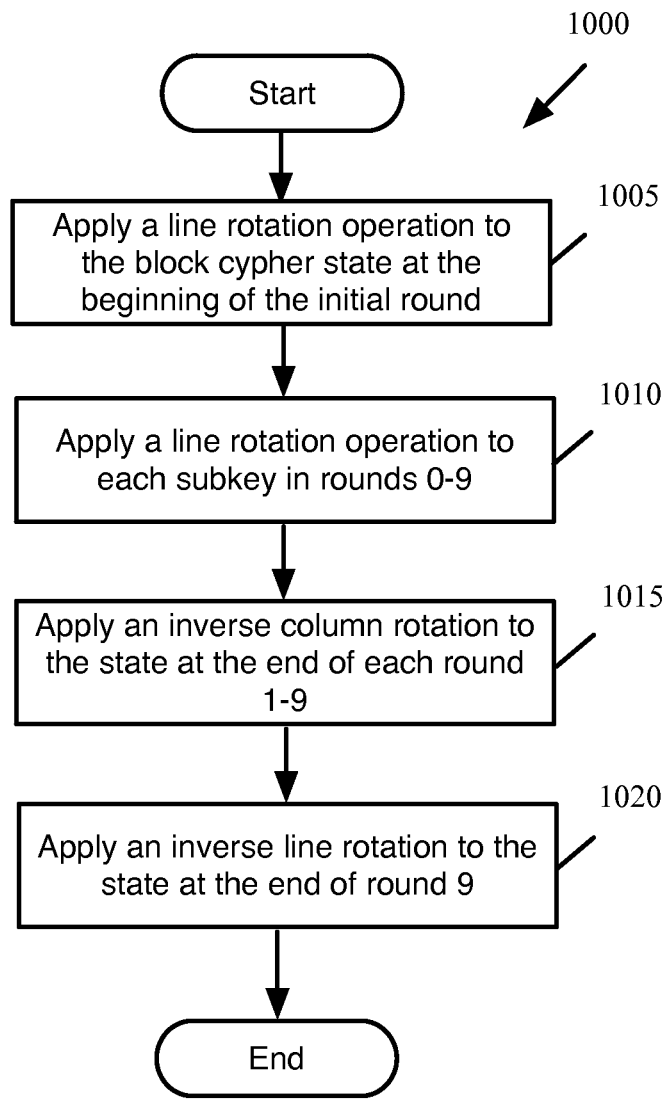
FIG. 10 conceptually illustrates a process for reordering the state for several rounds of a cipher block cryptography process in some embodiments of the invention.

FIG. 10 conceptually illustrates a process 1000 for reordering the state for several rounds of a cipher block cryptography process in some embodiments of the invention. In some embodiments, process 1000 implements the block cipher shown in FIG. 9. For simplicity, only the operations that are unique to the current invention are described. Operations such as AddRoundKey 115, 124, and 133; SubBytes 121 and 131; ShiftRows 122 and 132; and MixColumns 123 of FIG. 9 are not described in FIG. 10.

As shown, the process applies (at 1005) a line rotation operation (e.g., LineRotation operation 940 in FIG. 9) to the block cipher state (e.g., state 140 in FIG. 9) at the beginning of the initial round. The process then applies (at 1010) a line rotation operation (e.g., LineRotation operations 941 and 942 in FIG. 9) to each subkey (e.g., subkey_0 160 and subkey_1-subkey_9 165 in FIG. 9) in all rounds except the final round (i.e., rounds 0-9 in an AES cipher).

The process then applies (at 1015) inverse column rotation (e.g., Inverse ColumnRotation operations 943 and 944 in FIG. 9) to the state at the end of each intermediate round (i.e., rounds 1-9 in an AES cipher). The process then applies (at 1020) an inverse line rotation (e.g., Inverse LineRotation operation 945 in FIG. 9) to the state at the beginning of the final round (i.e., at the end of round 9 or the beginning of round 10 in an AES cipher). The process then ends.

D. Efficiently Applying a Line Rotation in the AES

In a typical AES implementation, the round looks like the following (where the notation xnm denotes byte n of word m. For example referring to FIG. 2, x12 is byte 1 of word 2 or x9):

$$(x00, x01, x02, x03) = t0$$

$$(x10, x11, x12, x13) = t1$$

$$(x20, x21, x22, x23) = t2$$

$$(x30, x31, x32, x33) = t3$$

In the above 4 equations, t0-t3 correspond to w0-w3 in FIG. 2. For instance, t0 corresponds to w0, which is the first column seen as a 4 bytes vector.

$$t0 = k0 \hat{} Td0[x03] \hat{} Td1[x32] \hat{} Td2[x21] \hat{} Td3[x10]$$

$$t1 = k1 \hat{} Td0[x13] \hat{} Td1[x02] \hat{} Td2[x31] \hat{} Td3[x20]$$

$$t2 = k2 \hat{} Td0[x23] \hat{} Td1[x12] \hat{} Td2[x01] \hat{} Td3[x30]$$

$$t3 = k3 \hat{} Td0[x33] \hat{} Td1[x22] \hat{} Td2[x11] \hat{} Td3[x00]$$

The above 4 equations correspond to one round. The Td table implements SB, SR, and MC. In the above equations, k0-k3 are the words corresponding to schedule key. For instance, k0 is made of the first column of K, where K is a 4×4 state. Applying a line rotation is quite simple. As a straightforward solution, it suffice to replace:

$$(x00, x01, x02, x03) = t0$$

$$(x10, x11, x12, x13) = t1$$

$$(x20, x21, x22, x23) = t2$$

$$(x30, x31, x32, x33) = t3$$

by $$(x01, x02, x03, x00) = t0$$

$$(x11, x12, x13, x10) = t1$$

$$(x21, x22, x23, x20) = t2$$

$$(x31, x32, x33, x30) = t3$$

One advantage of the above technique is instead of shuffling 16 bytes to perform line rotations, only 4 pointers are shuffled. Another (equivalent) solution is to do the following computations beforehand:

$$t0 = \text{Rot8}(t0)$$

$$t1 = \text{Rot8}(t1)$$

$$t2 = \text{Rot8}(t2)$$

$$t3 = \text{Rot8}(t3)$$

As noted above, t0-t3 correspond to w0-w3 in FIG. 2. For instance, t0 corresponds to w0, which is the first column seen as a 4 bytes vector.

And another way to do the same computation but not changing the code, is to define the pointers (Td0', Td1', Td2', Td3') to be the rotated ones:

$$Td0' = Td3$$

$$Td1' = Td0$$

$$Td2' = Td1$$

$$Td3' = Td2$$

And use (Td0', Td1', Td2', Td3') instead of (Td0, Td1, Td2, Td3) in the code.

E. Combining Line Rotations for the Whole AES

An interesting property of the column rotations is that they can be applied at the beginning of the AES and removed only at the end of the AES (the subkeys have to also be column-rotated). The followings describe the application of line rotations to AES. Since:

$$\text{AES\_ENC}(LR(S), LR(K)) = LR \; o \; CR \; o \; \text{AES\_ENC}(S, K)$$

and since the AES is made of 10 AES_ENC rounds (minus a mix-column, which commutes correctly with LR and CR), therefore:

$$\text{AES}(LR(S), LR'(\text{Keyschedule})) = LR \; o \; CR^{**}10 \; o \; \text{AES}(S, \text{Keyschedule})$$

Since $CR^{}4 = CR^{}8 = \text{Id}$:

$$\text{AES}(LR(S), LR'(\text{Keyschedule})) = LR \; o \; CR^{**}2 \; o \; \text{AES}(S, \text{Keyschedule})$$

Here, LR'(keyschedule) is defined as applying LR to all the subkeys of the keyschedule, and $CR^{}i$ on the ith subkey. In other words, applying LR and LR' or $LR^{}3$ and $LR'^{}3$, on the input and keys produces $LR^{}2$ o $CR^{}2$ as output transformation, which is easy to remove. Also, adding $LR^{}2$ and $LR'^{}2$ on the input and keys produces $LR^{}2$ only on the output (since the accumulated CR power is then 20, and $CR^{}20 = \text{Id}$). Accordingly, line rotations can be combined with the column rotations at the beginning and at the end of the AES, since the cost of removing CR or $CR^{}3$ is the same.

Figure 11:
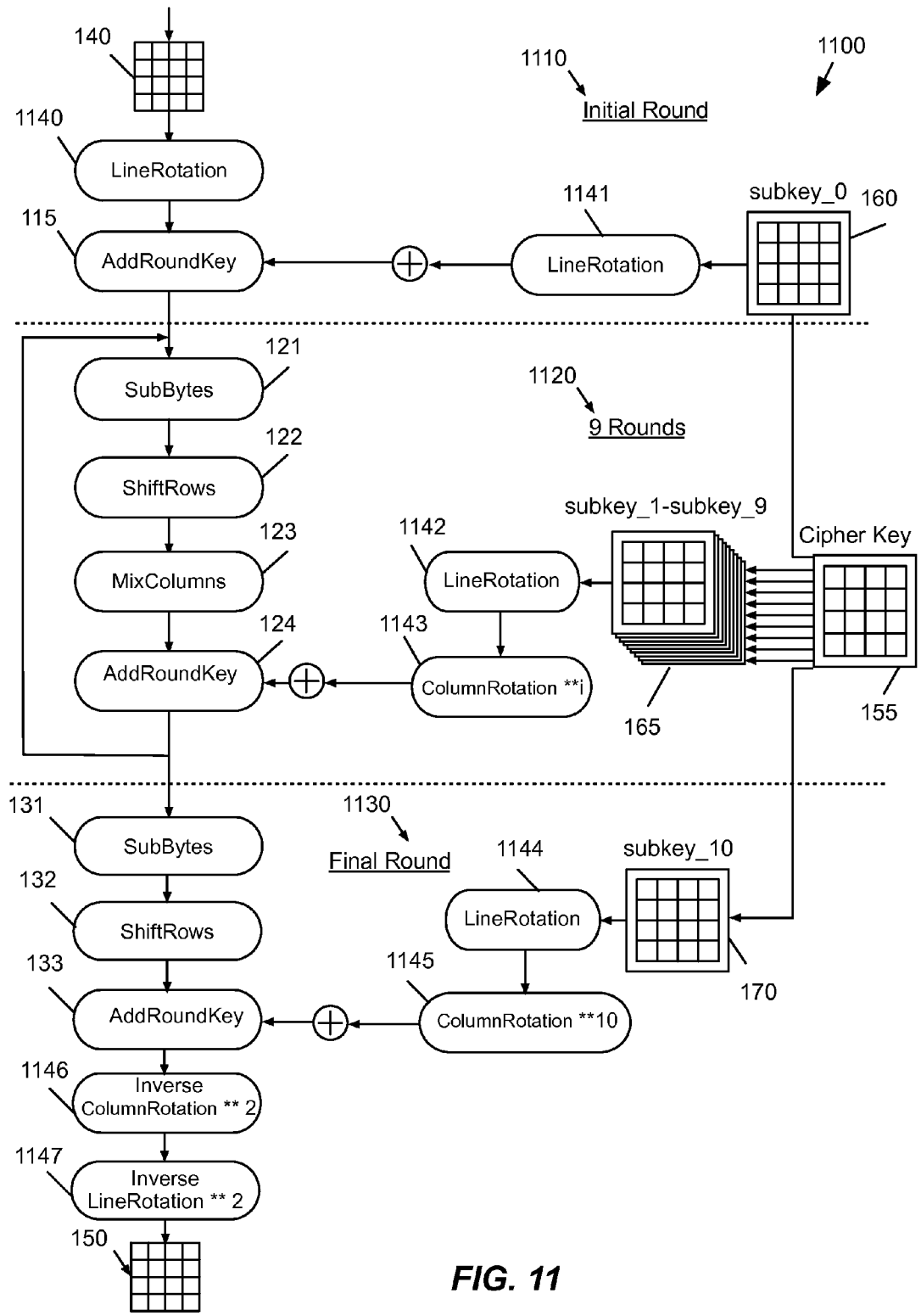
FIG. 11 conceptually illustrates an example cryptographic operation (e.g., an encryption or decryption operation) that uses line rotation to reorder the state for the whole cryptographic process in some embodiments of the invention.

FIG. 11 conceptually illustrates an example cryptographic operation 1100 (e.g., an encryption or decryption operation) that uses line rotation to reorder the state for the whole cryptographic process in some embodiments of the invention. Similar to FIG. 1, input data 140 is processed in an initial round 1110, nine middle rounds 1120, and a final round 1130, to produce output state 150. For a decryption operation, the input data 140 is encrypted data (referred to as cipher text) and the output state 150 is decrypted data (which may be plain text, or cipher text in the case that the input data was encrypted multiple times). Similarly, for encryption, the input data 140 may be previously encrypted data or unencrypted data (cipher text or plain text), and the output data 150 is encrypted data (cipher text, which will be twice encrypted in the case that the input is also cipher text). The input data 140 can be any computer readable message (or, more accurately, a block of such a computer readable message). For instance, the input data 140 could be a portion of an encrypted content file, video content, image content, audio content, a computer message, a secure transmission, or any other string of values that can be encoded as bits.

Operations that are similar to operations of FIG. 1 are not repeated for simplicity. As shown in FIG. 11, a LineRotation operation 1141, 1142, and 1144 is applied to the subkeys for the initial round 1110, the middle rounds 1120, and the final round 1144, respectively. In addition, a ColumnRotation $^{}i$ 1143 and 1145 is applied to the ith subkey (where i is the round index). Column rotation $^{}i$ for the initial round and any other round where column rotation $^{}i$ is equal to Id is skipped. For instance, in an AES block cipher where the state is a matrix of 4×4 words, ColumnRotation $^{}i = \text{Id}$ for rounds 0, 4, and 8.

At the end of the final round, the extra $LR^{}2$ and $CR^{}2$ are removed by performing an Inverse ColumnRotation $^{}2$ operation 1146, and an Inverse LineRotation operation 1147. The final state 150 in FIG. 9 is the same as the final state 150 in FIG. 1**.

Figure 12:
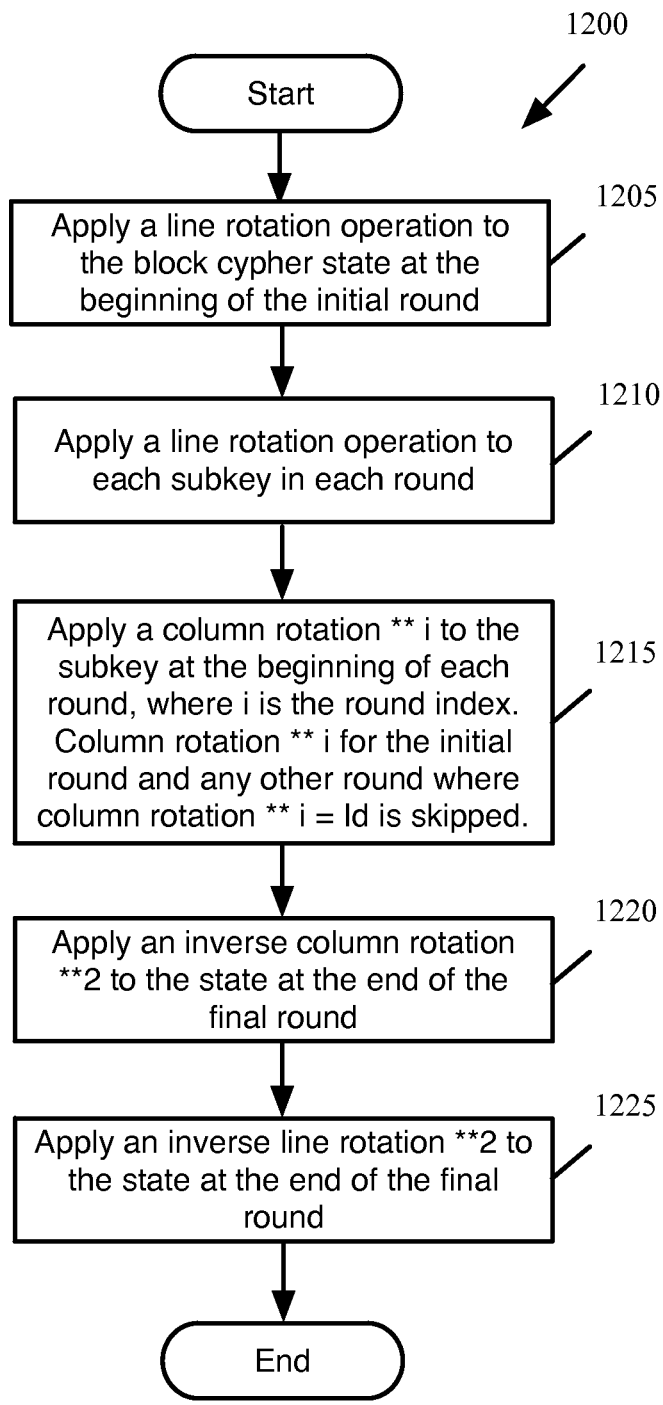
FIG. 12 conceptually illustrates a process for reordering the state for a complete cipher block cryptography process in some embodiments of the invention.

FIG. 12 conceptually illustrates a process 1200 for reordering the state for a complete cipher block cryptography process in some embodiments of the invention. In some embodiments, process 1200 implements the block cipher shown in FIG. 11. For simplicity, only the operations that are unique to the current invention are described. Operations such as AddRoundKey 115, 124, and 133; SubBytes 121 and 131; ShiftRows 122 and 132; and MixColumns 123 of FIG. 11 are not described in FIG. 12.

As shown, the process applies (at 1205) a line rotation operation (e.g., LineRotation operation 1140 in FIG. 11) to the block cipher state (e.g., state 140 in FIG. 11) at the beginning of the initial round. The process then applies (at 1210) a line rotation operation (e.g., LineRotation operations 1141, 1142, and 1144 in FIG. 11) to each subkey (e.g., subkey_0 160, subkey_1-subkey_9 165, and subkey_10 170 in FIG. 11) in each round.

The process then applies (at 1215) a column rotation \*\*i (e.g., ColumnRotation \*\*i operations 1143 and 1145 in FIG. 11) to the subkey at the beginning of each round, where i is the round index (i.e., 0=<i=<10 in an AES cipher). Since ColumnRotation \*\*0=Id, there is no need to apply a column rotation at the beginning of the initial round. Also, since ColumnRotation \*\*4 and ColumnRotation \*\*8 are equal to Id in an AES block cipher, in the embodiments that the block cipher is AES, the ColumnRotation \*\*i for round 4 and 8 are also skipped.

The process then applies (at 1220) an inverse column rotation \*\*2 (e.g., Inverse ColumnRotation \*\*2 1146 in FIG. 11) to the state at the end of the final round (i.e., at the end of round 10 in an AES cipher). The process then applies (at 1225) an inverse line rotation \*\*2 (e.g., Inverse LineRotation \*\*2 1147 in FIG. 11) to the state at the end of the final round. The process then ends.

Figure 13:
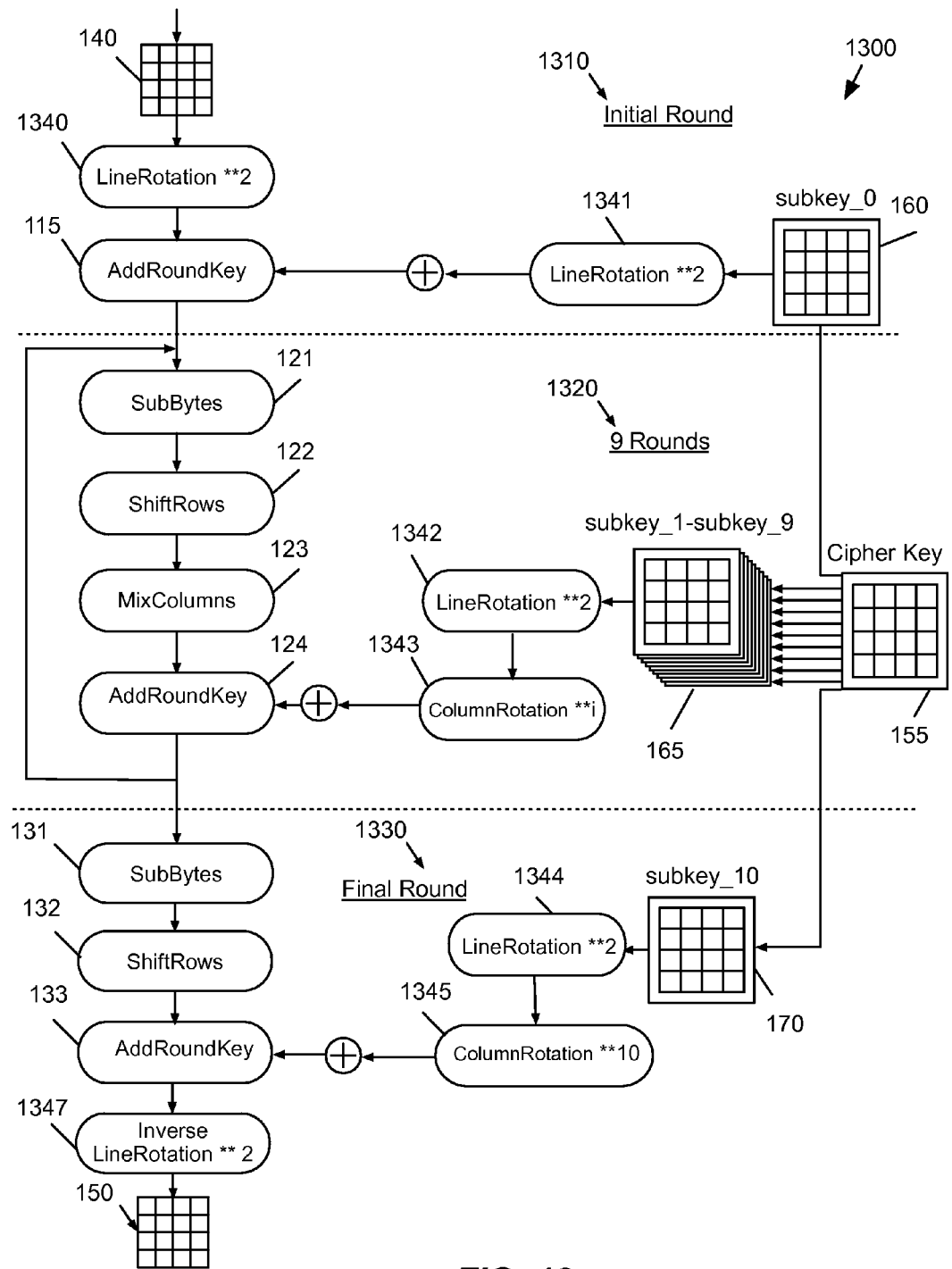
FIG. 13 conceptually illustrates an example of an alternative cryptographic operation (e.g., an encryption or decryption operation) that uses line rotation to reorder the state for the whole cryptographic process in some embodiments of the invention.

FIG. 13 conceptually illustrates an example of an alternative cryptographic operation 1300 (e.g., an encryption or decryption operation) that uses line rotation to reorder the state for the whole cryptographic process in some embodiments of the invention. Similar to FIG. 1, input data 140 is processed in an initial round 1310, nine middle rounds 1320, and a final round 1330, to produce output state 150. For a decryption operation, the input data 140 is encrypted data (referred to as cipher text) and the output state 150 is decrypted data (which may be plain text, or cipher text in the case that the input data was encrypted multiple times). Similarly, for encryption, the input data 140 may be previously encrypted data or unencrypted data (cipher text or plain text), and the output data 150 is encrypted data (cipher text, which will be twice encrypted in the case that the input is also cipher text). The input data 140 can be any computer readable message (or, more accurately, a block of such a computer readable message). For instance, the input data 140 could be a portion of an encrypted content file, video content, image content, audio content, a computer message, a secure transmission, or any other string of values that can be encoded as bits.

Operations that are similar to operations of FIG. 1 are not repeated for simplicity. As shown in FIG. 13, a LineRotation \*\*2 operation 1341, 1342, and 1344 is applied to the subkeys for the initial round 1310, the middle rounds 1320, and the final round 1344, respectively. In addition, a ColumnRotation \*\*i 1343 and 1345 is applied to the ith subkey (where i is the round index). Column rotation \*\*i for the initial round and any other round where column rotation \*\* i is equal to Id is skipped. For instance, in an AES block cipher where the state is a matrix of 4×4 words, ColumnRotation \*\*i=Id for rounds 0, 4, and 8.

At the end of the final round, the extra LR\*\*2 is removed by performing an Inverse LineRotation operation 1347. The final state 150 in FIG. 9 is the same as the final state 150 in FIG. 1. As shown, the inverse column rotation \*\*2 1146 done in FIG. 11 is avoided in cryptographic operation of FIG. 13.

Figure 14:
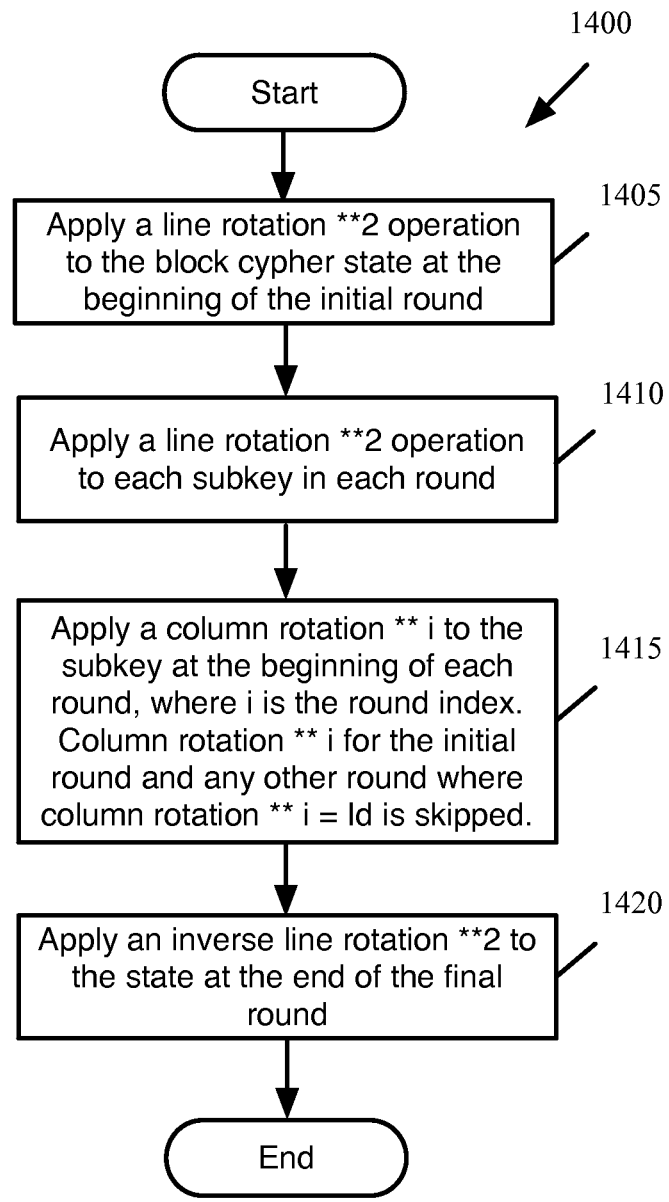
FIG. 14 conceptually illustrates an alternative process for reordering the state for a complete cipher block cryptography process in some embodiments of the invention.

FIG. 14 conceptually illustrates an alternative process 1400 for reordering the state for a complete cipher block cryptography process in some embodiments of the invention. In some embodiments, process 1400 implements the block cipher shown in FIG. 13. For simplicity, only the operations that are unique to the current invention are described. Operations such as AddRoundKey 115, 124, and 133; SubBytes 121 and 131; ShiftRows 122 and 132; and MixColumns 123 of FIG. 13 are not described in FIG. 14.

As shown, the process applies (at 1405) a line rotation operation \*\*2 (e.g., LineRotation \*\*2 operation 1340 in FIG. 13) to the block cipher state (e.g., state 140 in FIG. 13) at the beginning of the initial round. The process then applies (at 1410) a line rotation \*\*2 operation (e.g., LineRotation \*\*2 operations 1341, 1342, and 1344 in FIG. 13) to each subkey (e.g., subkey_0 160, subkey_1-subkey_9 165, and subkey_10 170 in FIG. 13) in each round.

The process then applies (at 1415) a column rotation \*\*i (e.g., ColumnRotation \*\*i operations 1343 and 1345 in FIG. 13) to the subkey at the beginning of each round, where i is the round index (i.e., 0=<i=<10 in an AES cipher). Since ColumnRotation \*\*0=Id, there is no need to apply a column rotation at the beginning of the initial round. Also, since ColumnRotation \*\*4 and ColumnRotation \*\*8 are equal to Id in an AES block cipher, in the embodiments that the block cipher is AES, the ColumnRotation \*\*i for round 4 and 8 are also skipped.

The process then applies (at 1420) an inverse line rotation \*\*2 (e.g., Inverse LineRotation \*\*2 1347 in FIG. 13) to the state at the end of the final round. The process then ends.

F. Different Line Rotations Per Round

While the Section title "Combining Line Rotations for the Whole AES," above considered a global line rotation, it is however possible to have different line rotations per round, and to vary from one LR power to another. Since the column rotation commutes completely with the AES round (with the exception of the ARK, which need to take it into account), it is possible to have for each round i a line rotation of index p_i. The final column rotation index to apply at the end would then be:

CR\*\*((p_0+p_1+ ... +p_9)%4)

where "%" denotes the modulo operation.

However the p_i can be chosen to have:

(p_0+p_1+ ... +p_9)%4=0

This is very practical since no column rotation is necessary at the end in this configuration, while allowing more possibilities than the single LR\*\*2 input permutation at the beginning.

G. Dynamic Computation of the LR and CR Index

The above-mentioned methods can be implemented statically (i.e., at code compilation time), as explained above in the Section titled "Efficiently Applying a Line Rotation in the AES". However the methods can also be done dynamically (i.e., the line rotations are chosen randomly at execution time, depending on some entropic context variables or a random input that can depend on the input state, the key, current time, a random value in a stack, etc.). The two modes can also be advantageously combined together.

Consider an index i that provides the power of LR to apply on a state. To apply a second LR power j on that state, the resulting index of the power of LR is (i+j), or (i+j) % 4, since LR is of order 4.

The same is true for CR. CR is of order 4, so the power of the CR transformation to apply must be done with an addition modulo 4. To have both CR and LR on a given state, one can have two indexes i_C and i_L and update them with an addition modulo 4. Some embodiments cover another way to do this with only one value.

The group (Z/65Z)*, the set of all invertible integers modulo 65, is a group of order 48. A group in mathematics includes a set of elements and an operation that, when applied to any two elements in the group, results in another element in the group. The operation satisfies closure, associativity, identify element, and invertibility. The group (Z/65Z)* is isomorphic to (Z/4Z)×(Z/4Z)×(Z/3Z). Its multiplicative subgroups of order 4 are {1, 21, 51, 31} and {1, 27, 14, 53}. The multiplicative subgroup of order 3 is: {1, 16, 61}. These subgroups are multiplicatively generated:

$$51=21*21[\text{modulo } 65]=21**2[\text{modulo } 65]$$

$$31=21*51[\text{modulo } 65]=21**3[\text{modulo } 65]$$

and $$14=27*27[\text{modulo } 65]=27**2[\text{modulo } 65]$$

$$53=27*14[\text{modulo } 65]=27**3[\text{modulo } 65]$$

and $$61=16**2[\text{modulo } 65]$$

Replacing 51 with 212 and 31 with 213, the subgroup {1, 21, 51, 31} can thus be seen as:

$$\{1,21,212,213\}$$

Similarly, replacing 14 with 272 and 53 with 273, the subgroup {1, 27, 14, 53} can be seen as:

$$\{1,27,272,273\}$$

Also, replacing 61 with 16**2, the group {1, 16, 61} can be seen as:

$$\{1,16,16**2\}$$

All elements in (Z/65Z)* can be decomposed as x . y . z with x in {1, 21, 212, 213}, y in {1, 27, 272, 273} and z in {1, 16, 16**2}.

The discussions are restricted to elements of the form: x . y. These elements are thus elements of a group isomorphic to (Z/4Z)×(Z/4Z). This property is a useful property. In fact LR and CR can also be seen as elements of a group isomorphic to (Z/4Z)×(Z/4Z).

Given that CR4=Id, the group {Id, CR, CR2, CR3} is a group for the composition law. The same property exists for {Id, LR, LR2, LR3}. Consider the set made of CRi o LRj, for i, in [0, 3], there exists a set isomorphic to (Z/4Z)×(Z/4Z). Accordingly, there exists a bijective isomorphism from {1, 21, 212, 213}×{1, 27, 272, 273} to {Id, CR, CR2, CR3}×{Id, LR, LR2, LR**3}.

Now, since 1 maps Id, it suffices to define that CR is the image of 21 and that LR is the image of 27. Given an element X in (Z/65Z)* equal to 21**i_C * 27i_L modulo 65, the element is mapped by the isomorphism to CR i_C o LR**i_L.

This isomorphism makes it possible to do simple mathematical operations of multiplications and modular reductions in order to compute the desirable transformation to apply on AES states. Accordingly, there exists a way to map i_C and i_L to a unique value in (Z/65Z)*, which thus enables to represent any combination of line and column rotations into an integer. For instance a multiplication by 21 on the integers is equivalent at applying CR and a multiplication by 27 is equivalent at applying LR.

To use this value in Z/65Z, i.e. [0, 64], a table of size 65 is constructed that includes elements that enable to compute the index permutation. For example, it can be the offset of the pointer to take for the Td0 . . . Td3 in the case of LR, as explained in Section titled "Efficiently Applying a Line Rotation in the AES," above or it can be the offset to use to perform a column rotation. Or, as discussed in the next section, be directly a representation of the index permutation to apply.

Other groups Z/NZ can be found, the only requirement is that (Z/4Z)×(Z/4Z) is a subgroup of (Z/NZ)*. Any N of the form (4 k1+1) * (4 k2+1) * k3, where k1, k2 are odd integers, k1 is not equal to k2, and k3 is any integer is a correct choice, which provides numerous different choices.

Figure 15:
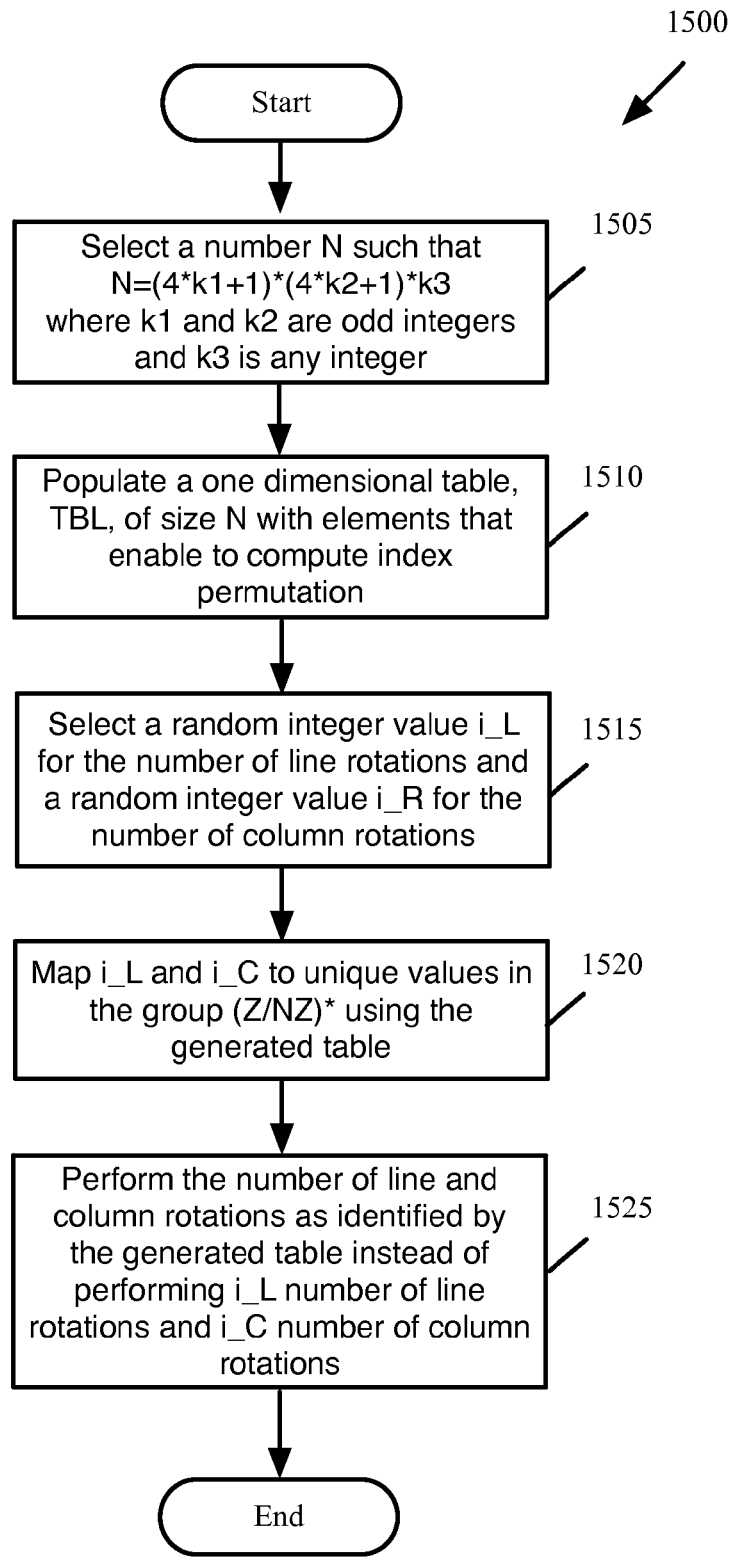
FIG. 15 conceptually illustrates a process for dynamically computing line rotation and column rotation indexes in some embodiments of the invention.

FIG. 15 conceptually illustrates a process 1500 for dynamically computing line rotation and column rotation indexes in some embodiments of the invention. As shown, the process selects (at 1505) a number N such that N=(4*k1+ 1)*(4*k2+1)*k3; where k1 and k2 are odd integers; where k1 is not equal to k2; and where k3 is any integer. For instance, selecting k1=1, k2=3, and k3=1 results in N=65.

The process then populates (at 1510) a one-dimensional table, TBL, of size N with elements that enable computing line and column rotation index permutations. The process first finds the order 4 subgroups as described above. The elements in Z/NZ are examined until some elements are found such that (1, X, X*2, X*3) and (1, Y, Y*2, Y*3) form two distinct subgroups.

The process then selects (at 1515) a random integer i_L for the number of line rotations and a random integer i_C for the number of column rotations to apply. When the block cipher is AES, the size of state matrix is 4×4 and for any random integer, r, LRr+4 will be equal to LRr and CRr+4 will be equal to CRr. The random integers, i_L and i_C, for AES are therefore selected to be between 0 and 3 (or modulo 4 of any selected random number is calculated to derive i_L and i_C to a value between 0 and 3). For block ciphers with different sizes such as n×n, the random numbers i_L and i_C will be between 0 to n−1.

The process then maps (at 1520) i_L and i_C to unique values in the group (Z/NZ)* using the generated table, TBL. Specifically, using X and Y as the two generators 21 and 27 (as described above), the process computes X*i_L . Y*i_C. For instance, the mapping can be used to generate the offset of the pointer to take for the Td0 . . . Td3 in the case of LR, as explained in Section titled "Efficiently Applying a Line Rotation in the AES," above or it can be the offset to use to perform a column rotation. The above mentioned U.S. Patent Publication 2014/0348323 provides further details for the use of i_C.

The process then performs (at 1525) the number of line and column rotations as identified by the generated table instead of performing i_L number of line rotations and i_C number of column rotations. Process 1500 is used in some embodiments in conjunction with the block cipher processes described above by reference to FIGS. 9-14 to dynamically select the number of line and/or column rotations for the block cipher process. The dynamic selection is particularly useful to prevent statistical attacks, since it allows breaking the mapping between one byte of the mathematical computations and one address of the executed code. For instance in statistical attack, an attacker repeatedly executes the same code and determines whether the same value appears after certain execution of the same location in the code. By dynamically selecting different numbers of line and/or column rotations to perform, the value generated after the execution of the same location in the code changes each time because of the randomness in the number of line and/or column rotations.

H. Implementing Shift Row with Vector Instructions

Vector instructions are instructions that act on multiple Byte/Word at the same time. For instance, instructions_mm_xor_si128 (in the architecture by Intel Corporation) or veorq_u8 (in ARM architecture by ARM Holdings) enable to do 16 XOR at the same times on 16-Byte long register. This enables faster and smaller binaries. This kind of instructions exists for all the classical instruction: add, sub, xor, or, and, shift on ARM and Intel CPUs.

In addition to these extensions of classical operations, there exists new kinds of operations, e.g., by using a 16-Byte table look up. If two registers of 16 Bytes represent two tables T1 and T2, with all values of T2 in [0 . . . 15], T1 does not have any constraint. There exist instructions that will compute T1[T2], i.e. T1[T2[i]] for i from 0 to 15. These instructions are _mm_shuffle_epi8 (Intel architecture), vtb12_u8 (ARM architecture ARMv7) and vtb11q_u8 (ARM architecture ARM64). Use of these instructions enables saving computational time when dealing with vector reordering.

Implementing ShiftRow can be done with one TLU instruction using the table:

$T\_SR=\{0x00, 0x05, 0x0a, 0x0f, 0x04, 0x09, 0x0e, 0x03,$
$0x08, 0x0d, 0x02, 0x07, 0 \ x0c, 0x01, 0x06, 0x0b\}$

Inverse shift Row can also be done using one TLU:

$T\_ISR=\{0x00, 0x0d, 0x0a, 0x07, 0x04, 0x01, 0x0e, 0x0b,$
$0x08, 0x05, 0x02, 0x0f, 0 \ x0c, 0x09, 0x06, 0x03\}$

In this case T1 is the AES state and T2 is T_SR or T_ISR. Then T1[T2[i]] for i from 0 to 15 is a reordering of T1 using T2. With the Intel or ARM TLU instruction, this is straightforward, and only costs one operation.

Any permutation σ can be implemented using T_σ={σ(0), . . . σ(15)}. For this reason, it is easy to add confusion at a small cost using TLU instructions. For this purpose, index permutations are used: function that permutes the components of a 16-Byte vector. The following shows how to keep the 16-Byte vector index permuted during a whole AES for almost no overhead.

As described above, index permutations (IP), such as SR for the 16-Byte AES state, commute with SB, since SB only acts on Byte individually. IP also commutes with ARK assuming that the key is already correctly index permuted. So for these two steps, any IP can be used.

In general, IP does not commute with SR. Assuming that a state is permuted by an IP, to apply SR and to keep IP applied, the following index permutation can be applied: IP o SR o IP-1. Indeed, with the protected state S' being the index permuted state S:

$S'=IP(S)$ and

IP o SR o IP-1(S')=IP o SR o IP-1(IP(S))

or

IP o SR o IP-1(S')=IP(SR(S))

This is SR(S) protected with IP. IP o SR o IP-1, which is an index permutation and is thus applied as fast as SR with one TLU instruction. Last AES operation is MC. MC commutes with only two sorts of IP: line rotations and column permutations. By design, MC is the application of 4 32×32 matrix to 4 32-bit words. AES column can be permuted since they are independent for the MC operation. There are 24 possible column permutations.

Since MC and Rot8 commute, one can freely choose for each AES column a rotation amongst (Id, Rot8, Rot16, Rot24): this is called line rotation since each of the word is in column vector.

This leads to 4*4*4*4 possible word rotation and to 24 column permutation: there thus are 6144 possible IP that commutes with MC (and IMC). So, when the AES is computed Byte-wise, one can use these 6144 permutations instead of the 4×4=16 line and column rotations.

I. Including Line Rotations Directly in Tables

Some embodiments include directly some line rotations in the tables that are classically used to perform the MC (or IMC) steps. Indeed, if one rotates all the tables of a given MC step by a multiple of 8-bit, i.e., performs either Id, LR, LR2, LR3 on the table, one will actually compute the expected result, but in the corresponding Id, LR, LR2, LR3 form. Thus, by including some line rotations in the pre-computed tables, it is possible to perform a free protection, and add more obscurity to your code. This allows fixing the column rotations implied by other line rotations:

$CR^{**}((p\_0+p\_1+ \ldots +p\_9+l\_0+ \ldots l\_9)\%4)$ (as described in previous paragraphs), where p_i are line rotations done by the code, and l_i are line rotations done directly in the output of the tables. By choosing the parameters such that _0+p_1+ . . . +p_9+l_0+ . . . l_9==0 mod 4, you have not to correct the result at the end of the computation.

III. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 16:
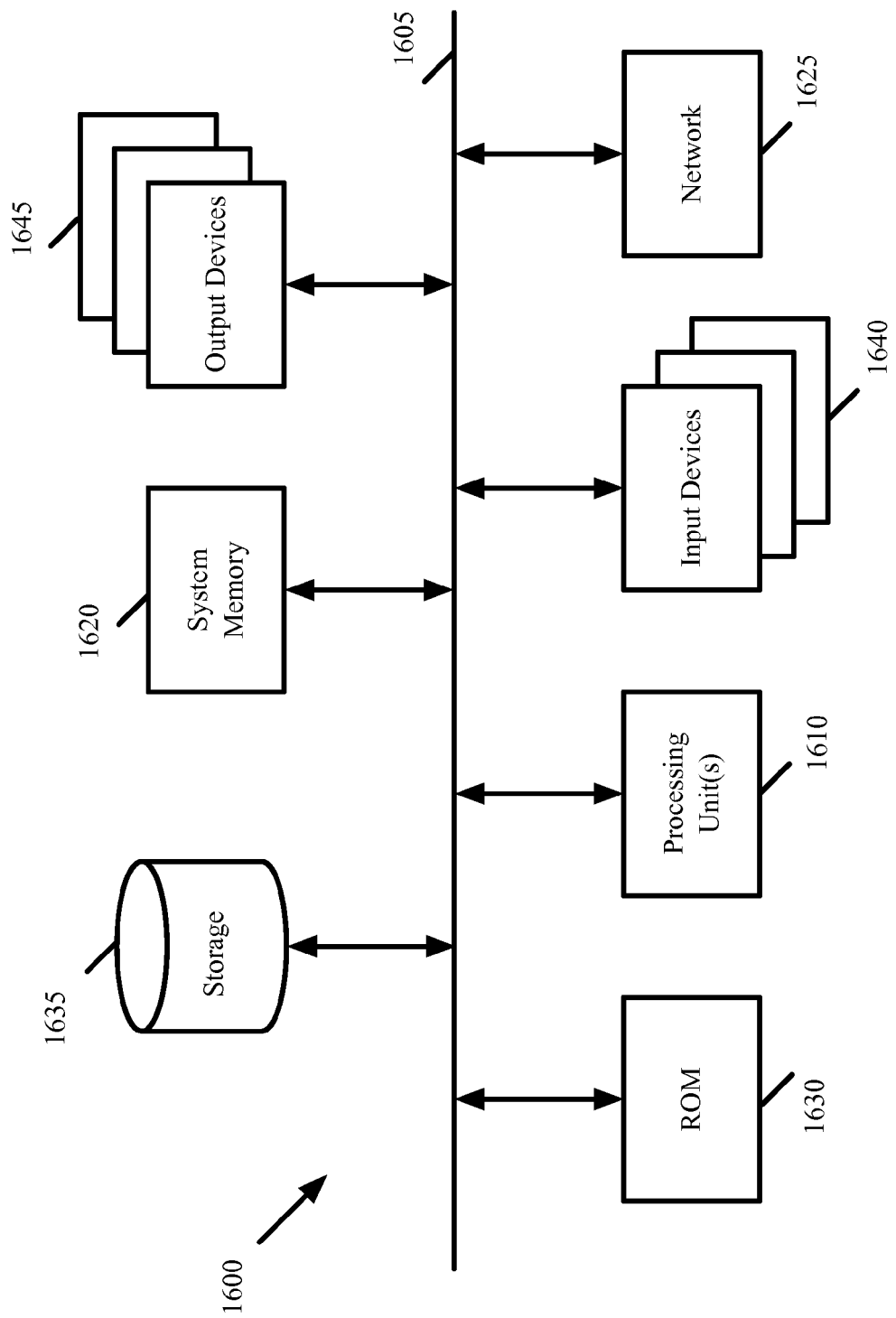
FIG. 16 conceptually illustrates an electronic system with which some embodiments of the invention are implemented.

FIG. 16 conceptually illustrates another example of an electronic system 1600 with which some embodiments of the invention are implemented. The electronic system 1600 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1600 includes a bus 1605, processing unit(s) 1610, a system memory 1620, a network 1625, a read-only memory (ROM) 1630, a permanent storage device 1635, input devices 1640, and output devices 1645.

The bus 1605 collectively represents all system, peripheral, and chipset buses that communicatively connect the numerous internal devices of the electronic system 1600. For instance, the bus 1605 communicatively connects the processing unit(s) 1610 with the read-only memory 1630, the system memory 1620, and the permanent storage device 1635.

From these various memory units, the processing unit(s) 1610 retrieves instructions to execute and data to process in order to execute the processes of the invention. The processing unit(s) may be a single processor or a multi-core processor in different embodiments.

The read-only-memory 1630 stores static data and instructions that are needed by the processing unit(s) 1610 and other modules of the electronic system. The permanent storage device 1635, on the other hand, is a read-and-write memory device. This device is a non-volatile memory unit that stores instructions and data even when the electronic system 1600 is off. Some embodiments of the invention use a mass-storage device (such as a magnetic or optical disk and its corresponding disk drive, integrated flash memory) as the permanent storage device 1635.

Other embodiments use a removable storage device (such as a floppy disk, flash memory device, etc., and its corresponding drive) as the permanent storage device. Like the permanent storage device 1635, the system memory 1620 is a read-and-write memory device. However, unlike storage device 1635, the system memory 1620 is a volatile read-and-write memory, such a random access memory. The system memory 1620 stores some of the instructions and data that the processor needs at runtime. In some embodiments, the invention's processes are stored in the system memory 1620, the permanent storage device 1635, and/or the read-only memory 1630. For example, the various memory units include instructions for processing multimedia clips in accordance with some embodiments. From these various memory units, the processing unit(s) 1610 retrieves instructions to execute and data to process in order to execute the processes of some embodiments.

The bus 1105 also connects to the input and output devices 1640 and 1645. The input devices 1640 enable the user to communicate information and select commands to the electronic system. The input devices 1640 include alphanumeric keyboards and pointing devices (also called "cursor control devices"), cameras (e.g., webcams), microphones or similar devices for receiving voice commands, etc. The output devices 1645 display images generated by the electronic system or otherwise output data. The output devices 1645 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 16, bus 1605 also couples electronic system 1600 to a network 1625 through a network adapter (not shown). In this manner, the computer can be a part of a network of computers (such as a local area network ("LAN"), a wide area network ("WAN"), or an Intranet), or a network of networks, such as the Internet. Any or all components of electronic system 1600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures such as FIGS. 10, 12, and 14-15 conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

The invention claimed is:

1. A computer implemented method for preventing an attacker from extracting keys of an iterated block cipher performed on a computing device, the block cipher comprising a subkey for each of a plurality of iterations comprising an initial iteration, a plurality of middle iterations, and a final iteration, the method comprising:
at the computing device, receiving and storing in a cipher state matrix, an encrypted message comprising content for a digital rights management (DRM) application, the encrypted message comprising a plurality of words, each word comprising a plurality of bytes, the cipher state matrix comprising a plurality of rows and a plurality of columns, each column storing a word of the message, each row storing a byte of each of the plurality of words of the message; and
at the computing device where the attacker has control over an execution process of the iterated block cipher, performing the iterated block cipher by:
performing a line rotation on each column of the cipher state matrix at the initial iteration, the line rotation comprising rotating the bytes of each word in a column;
performing a line rotation on the subkey of each of the plurality of iterations of the block cipher at a beginning of the corresponding iteration;
performing an inverse column rotation on the cipher state matrix at an end of each middle iteration; and
decrypting the content for the DRM application by performing an inverse of said line rotation on each column of the cipher state matrix at an end of the final iteration of the block cipher.

2. The method of claim 1, wherein the line rotation comprises rotating the bytes of each word in a column by 1 byte to the top.

3. The method of claim 1, wherein the line rotation comprises rotating the bytes of each word in a column by 2 bytes to the top.

4. The method of claim 1, wherein the line rotation comprises rotating the bytes of each word in a column by 3 bytes to the top.

5. The method of claim 1, wherein the line rotation comprises rotating the bytes of each word in a column by a different number of bytes for at least two iterations of the block cipher.

6. The method of claim 1, wherein each subkey is an iteration specific cipher key for one of a plurality of iterations of the iterated block cipher.

7. The method of claim 1, wherein each subkey comprises a same number of words as the cipher state matrix.

8. The method of claim 1, wherein each iteration of the block cipher is assigned an index of successive integer numbers starting from zero for the initial iteration of the block cipher and incrementing the index by one for each subsequent iteration, wherein performing a set of successive column rotations comprises performing a number of column rotations equal to the index assigned to the iteration.

9. The method of claim 1, wherein the block cipher is advanced encryption standard (AES).

10. A non-transitory machine readable medium storing a program which when executed by at least one processing unit of a computing device prevents an attacker from extracting keys of an iterated block cipher performed on the computing device, the block cipher comprising a subkey for each of a plurality of iterations comprising an initial iteration, a plurality of middle iterations, and a final iteration, the program comprising sets of instructions for:
receiving and storing in a cipher state matrix, an encrypted message comprising content for a digital rights management (DRM) application, the encrypted message comprising a plurality of words, each word comprising a plurality of bytes, the cipher state matrix comprising a plurality of rows and a plurality of columns, each column storing a word of the message, each row storing a byte of each of the plurality of words of the message; and
while the attacker has control over an execution process of the iterated block cipher, performing the iterated block cipher by:
performing a line rotation on each column of the cipher state matrix at the initial iteration, the line rotation comprising rotating the bytes of each word in a column;
performing a line rotation on the subkey of each of the plurality of iterations of the block cipher at a beginning of the corresponding iteration;
performing an inverse column rotation on the cipher state matrix at an end of each middle iteration; and
decrypting the content for the DRM application by performing an inverse of said line rotation on each column of the cipher state matrix at an end of the final iteration of the block cipher.

11. The non-transitory machine readable medium of claim 10, wherein the line rotation comprises rotating the bytes of each word in a column by 1 byte to the top.

12. The non-transitory machine readable medium of claim 10, wherein the line rotation comprises rotating the bytes of each word in a column by 2 bytes to the top.

13. The non-transitory machine readable medium of claim 10, wherein the line rotation comprises rotating the bytes of each word in a column by 3 bytes to the top.

14. The non-transitory machine readable medium of claim 10, wherein the line rotation comprises rotating the bytes of each word in a column by a different number of bytes for at least two iterations of the block cipher.

15. The non-transitory machine readable medium of claim 10, wherein each subkey is an iteration specific cipher key for one of a plurality of iterations of the iterated block cipher.

16. The non-transitory machine readable medium of claim 10, wherein each subkey comprises a same number of words as the cipher state matrix.

17. The non-transitory machine readable medium of claim 10, wherein each iteration of the block cipher is assigned an index of successive integer numbers starting from zero for the initial iteration of the block cipher and incrementing the index by one for each subsequent iteration, wherein the program further comprises a set of instructions for performing a set of successive column rotations by performing a number of column rotations equal to the index assigned to the iteration.

18. The non-transitory machine readable medium of claim 10, wherein the block cipher is advanced encryption standard (AES).

19. A computing device comprising:
a set of processing units; and
a non-transitory machine readable medium storing a program which when executed by at least one of the processing units prevents an attacker from extracting keys of an iterated block cipher, the block cipher comprising a subkey for each of a plurality of iterations comprising an initial iteration, a plurality of middle iterations, and a final iteration, the program comprising sets of instructions for:

receiving and storing in a cipher state matrix, an encrypted message comprising content for a digital rights management (DRM) application, the encrypted message comprising a plurality of words, each word comprising a plurality of bytes, the cipher state matrix comprising a plurality of rows and a plurality of columns, each column storing a word of the message, each row storing a byte of each of the plurality of words of the message; and while the attacker has control over an execution process of the iterated block cipher, performing the iterated block cipher by:

performing a line rotation on each column of the cipher state matrix at the initial iteration, the line rotation comprising rotating the bytes of each word in a column;

performing a line rotation on the subkey of each of the plurality of iterations of the block cipher at a beginning of the corresponding iteration;

performing an inverse column rotation on the cipher state matrix at an end of each middle iteration; and decrypting the content for the DRM application by performing an inverse of said line rotation on each column of the cipher state matrix at an end of the final iteration of the block cipher.

20. The device of claim 19, wherein the line rotation comprises rotating the bytes of each word in a column by 1 byte to the top.

21. The device of claim 19, wherein the line rotation comprises rotating the bytes of each word in a column by 2 bytes to the top.

22. The device of claim 19, wherein the line rotation comprises rotating the bytes of each word in a column by 3 bytes to the top.

23. The device of claim 19, wherein the line rotation comprises rotating the bytes of each word in a column by a different number of bytes for at least two iterations of the block cipher.

24. The device of claim 19, wherein each subkey is an iteration specific cipher key for one of a plurality of iterations of the iterated block cipher.

25. The device of claim 19, wherein each subkey comprises a same number of words as the cipher state matrix.

26. The device of claim 19, wherein each iteration of the block cipher is assigned an index of successive integer numbers starting from zero for the initial iteration of the block cipher and incrementing the index by one for each subsequent iteration, wherein the program further comprises a set of instructions for performing a set of successive column rotations by performing a number of column rotations equal to the index assigned to the iteration.

27. The device of claim 19, wherein the block cipher is advanced encryption standard (AES).

* * * * *